UNITED STATES PATENT OFFICE.

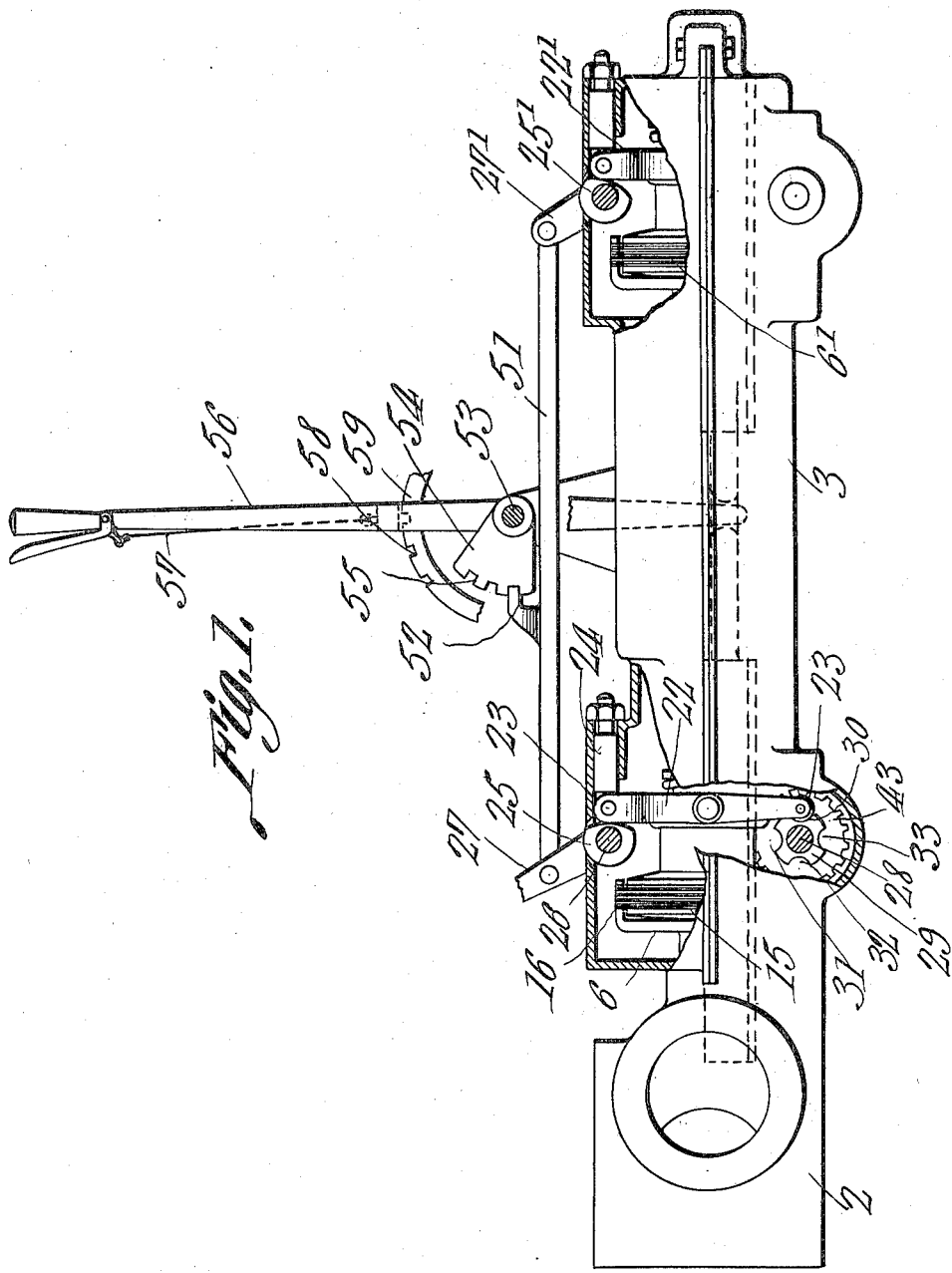

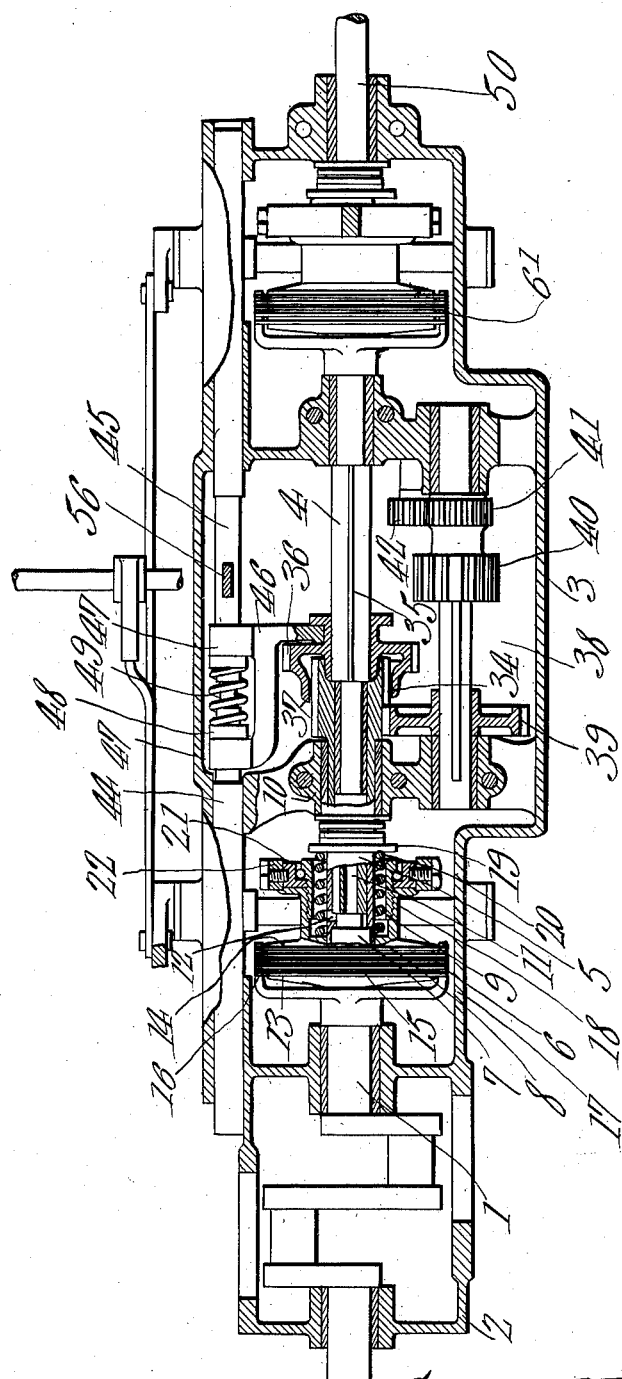

SAMUEL W. BLEVINS, OF CLARENDON, TEXAS.

TRANSMISSION-GEARING.

986,677.  Specification of Letters Patent.  Patented Mar. 14, 1911.

Application filed September 23, 1910. Serial No. 583,447.

*To all whom it may concern:*

Be it known that I, SAMUEL W. BLEVINS, a citizen of the United States, residing at Clarendon, in the county of Donley and State of Texas, have invented a new and useful Transmission-Gearing, of which the following is a specification.

This invention relates to transmission gearings and consists in the novel construction and arrangement of its parts hereinafter shown and described.

The object of the invention is to provide improvements in speed changing power transmission gearing of the class generally known as the sliding gear transmission and the principal object of the present invention is to provide means for securely holding and locking the sliding gears against movement to effect a change of speed until such time as the direct or frictional connection between the engine shaft and the driven shaft is interrupted. When this is done the change of speed may be readily effected thereby preventing the possibility of stripping the teeth from any of the gear wheels during the time that the change of speed is being made.

In the accompanying drawings:—Figure 1 is a side elevation of the transmission gearing with parts broken away and parts in section. Fig. 2 is a horizontal sectional view of the transmission gearing.

As shown in the drawings, 1 is the crank shaft mounted in suitable bearings in the crank case 2 of a double opposed motor, said crank case being formed integral with the lower half of the casing 3 of the power transmission mechanism.

4 is the driven shaft, mounted in suitable bearings in the casing in axial alinement with the crank shaft and 5 is a driving shaft connected with the end of the crank shaft by a friction clutch 6. A reduced end 7 of the crank shaft projects into the end of the tubular portion 8 of the driving shaft with a bushing 9 interposed between them and the bearing end of the said driving shaft projects into the opposite end of the tubular portion and is securely and rigidly keyed therein, said driving shaft being thus made in two parts for convenience in manufacturing. Said bearing end is supported in a suitable babbitted bearing 10 on the casing and it is axially bored inward from its rear end to receive a reduced end of the driven shaft and form a bearing therefor. A small axial bore 11 in said end extends therethrough to conduct oil inserted in the tubular portion of the shaft through an oil hole 12 therein to the bearing for the rigid end of the driven shaft.

The clutch 6 consists of a facing disk 13 secured upon the forward end of the tubular portion 8 of the driving shaft and an opposed facing disk 14 with a series of friction disks 15 and 16 between the disk 15 being attached to the shaft to turn therewith and slide longitudinally thereof and the disks 16 being of greater diameter and formed with notches in their periphery to receive the end of a yoke 17, which is rigidly secured to the crank shaft of the engine to cause said disks 16 to turn with the crank shaft. On the back of the facing disk 14 is a longitudinally extending sleeve 18 and sleeved upon the driving shaft within this sleeve between said disk and a collar 19 on said shaft is a heavy coiled spring 20 which normally exerts a force to move the facing disk 14 toward the facing disk 13 and clamp the friction disks between.

On the rear end of the sleeve 18 is supported a ring 21 with balls interposed between the sleeve and ring to turn freely and a ring yoke 22 embraces said ring and is pivotally attached thereto at each side by pivot bolts passing through the yoke and engaging seats on the ring. Between ears at the upper and lower sides of the yoke are journaled rollers 23. An adjusting pin 24 is pivotally attached at one end to the ears on the upper side of the yoke and slides within a bearing provided therefor in the casing, the opposite end of the said pin being screwthreaded to receive an adjusting nut which may be adjusted to limit the inward movement of said pin, the same being free to slide outward in its bearing when the yoke is rocked by the engagement of the cam 25 with the upper friction roller 23, said cam being secured upon the transverse shaft 26 mounted in bearings in the upper part of the casing and provided with an operating lever 27 which is preferably in the form of a foot lever or treadle.

Formed upon the bearing end of the driving shaft 5 is a gear 34 having a long face and upon the adjacent forward portion 35 of the driven shaft is a mounted gear wheel 36 to slide freely thereon, said gear wheel being formed with internal teeth 37 to engage the gear 34 and thus when said gear is in the position as shown in Fig. 2 the driving and driven shafts are operatively connected together by said gear and gear wheel 36 to rotate at the same speed.

A counter shaft 38 is supported in bearings in the casing and extends parallel with the driven shaft and on this counter shaft is secured a gear 39 in mesh with the gear 34 to transmit motion from the driving to the counter shaft. Secured upon the counter shaft at a distance from the gear 39 is a smaller gear or pinion 40 adapted to be engaged by the external teeth of the sliding gear 36 when said gear is moved along its shaft and out of engagement with the gear 34 so that motion will then be transmitted from the driving shaft through the large gear wheel 39, counter shaft, pinion 40 and large gear 36 to the driven shaft which will thus be turned at a slow speed. A still smaller pinion 41 is secured upon the counter shaft at a short distance to the rear of the pinion 40 and an idler 42 is mounted upon a stub shaft in the casing in mesh with said pinion to engage the sliding gear when the same is moved farther along its shaft, and thus the motion of the driven shaft will be reversed. The distance between the gear 34 and the pinion 40 is such that when the sliding gear is moved on its shaft its internal teeth will be disengaged from the gear 34 before its said external teeth will engage the pinion and thus in this position of the gear the driven shaft will be disconnected and no motion will be transmitted thereto.

Mounted in bearings in the casing and extending across the same adjacent the lower ears provided upon the yoke 22 is a shaft 28 upon which is secured a notched wheel or cam 29 consisting of a wheel or disk formed with four deep notches 30, 31, 32 and 33 to receive the lower friction roller 23 carried by the said yoke.

Secured upon the transverse shaft 28 near one side of the casing is a pinion 43 and sliding in suitable bearings in the casing is a rack bar 44 in engagement with said pinion, a rod is secured to one end of said rack and extends outward through a bearing. Mounted upon said rod 45 is a forked arm 46 the forked end of which is engaged with a groove in the hub of the shifting gear 36 so that when the rack bar is moved the sliding gear will be moved at the same time. This movement of the rack bar turns the transverse shaft 28 and revolves the notched wheel 29 the roll 23 being thus forced out of its notch and yoke 21 turned upon its pivotal connection with the pin 24 against the action of the spring 20 releasing the clutch. The clutch is thus released to disconnect the driving shaft from the crank shaft upon the first movement of the tripping rod 35 and before the sliding gear is being shifted into or out of engagement with the other gears, and thus the liability of stripping the teeth from the gears by bringing them into mesh while being driven is obviated. When the shifting gear is in the position shown in Fig. 2 the roll 23 is in the notch 30 but when the shifting rod is moved the notched wheel will be turned and the said roll will engage the notch 31 at which time the shifting gear will be out of engagement with the gear 34 and pinion 40 in which position the rod will be held by the action of the spring 20 against accidental shifting. Further movement of the shifting rod slides the gear into engagement with the pinion 40 and turns the wheel to engage its notch 32 with a roll and a still further shifting of the rod engages the gear with the idler and turns the wheel to engage the notch 33 with the roll. If when the sliding gear is shifted its teeth should obstruct those of the gear with which they should mesh and should said gear be standing still, owing to the fact that the clutch has been thrown out by the shifting a further movement of the shifting rod to turn the notched wheel far enough to permit the clutch to operate, and thus turn the gears, is permitted by providing a yielding connection or limited relative movement between the shifting rod and both arms. This connection consists in forming upon the arm 46 two bearing eyes 47 through which the shifting rod extends, and sleeves upon the said rod between these eyes are located as at 48 with a coiled spring 49 interposed between them. The coiled spring thus exerts a force to normally hold the sleeves apart but when the arm is prevented from moving in either direction by the failure of the gears to mesh or from some other cause the rod may be moved longitudinally through the eyes a limited distance against the action of the coiled spring. When the gears abut and the rod is moved, as described, to operate the clutch, as soon as the gears are turned into alinement they are instantly drawn into mesh by the action of the said spring 49 and the wear on the gears and the liability of breakage is greatly reduced by this yielding connection. By moving the lever 27 to throw the cam 25, the yoke is swung upon the roller 23 engaged in the notched wheel as a fulcrum and the clutch is released independently of the transmission gear and without the necessity of operating the shifting rod.

The end of the shaft 50 is journaled in the casing 2 in alinement with the driven shaft 4 and a clutch device 6' is adapted to operatively connect the driven shaft 4 with the said shaft 50. It is to be understood that the shaft 50 is operatively connected by any suitable means to the running gear of a vehicle or other machine to which the transmission gearing is applied. Inasmuch as the parts of the clutch device 6' are exactly the same as those of the clutch device which has heretofore been described it is deemed unnecessary to describe in detail the structural arrangement of the clutch device 6'. A lever 27' similar to the lever 27 hereinbefore described is fulcrumed at the rear end of the casing 2 and is provided with a cam 25' similar to the cam 25 hereinbefore described and which operates against a yoke 22' in a manner similar to that in which the yoke 22 is operated upon. A rod 51 operatively connects the upper portions of the levers 27 and 27' together and is provided at a point intermediate its ends with a finger 52. A shaft 53 is journaled upon the casing 2 and is provided with a fixed segment 54 which in turn is provided at its edge with indentations 55. The end of the finger 52 is adapted to enter the indentations 55 and the solid portions of the segment 54 between the said indentations form teeth which are adapted to coöperate with said finger in forming a locking mechanism for holding the shaft 53 and its attachments against movement while the members of the clutch devices 6 and 6' are in engagement with each other. The lever 27 may be provided with a foot treadle (of any desired pattern, not shown). A lever 56 is fixed to the shaft 53 and is provided with a lower end portion which passes through the shifting rod 45 hereinbefore described. The lever 56 also carries a spring actuated pawl 57 which is adapted to engage notches 58 in a segment 59 whereby the lever 56 is secured in adjusted position.

From the above it will be seen that when the operator places his foot upon the upper end of the lever 27 and swings the same so that the bar 51 is moved longitudinally the cams 25 and 25' are partially rotated which in turn operates the yokes 22 and 22' which separates the members of the clutches 6 and 6' from each other. Thus the intermediate shaft 4 is disconnected from the crank shaft 11 and the shaft 50 is disconnected from the shaft 4. However prior to the time that the lever 27 is moved in a forward direction as above indicated and the bar 51 is moved longitudinally the end of the finger 52 remains in engagement with one of the indentations 55 in the edge of the segment 54 and holds the lever 56 against movement. After the rod 51 has been moved in the manner as above indicated and the clutch members of the clutch devices 6 and 6' have been disengaged the lever 56 is free to be moved and inasmuch as the intermediate shaft 4 and the counter shaft 38 are then at a state of rest the shifting bar 45 and its attachments may be readily moved in order to bring the gear wheel 46 into mesh with any one of the gears mounted upon the counter shaft 38. Thus it will be seen that at the time that the shiftable gear is moved along the intermediate shaft 4 the gears upon the counter shaft are at rest and the said gear wheels may be readily intermeshed without liability of stripping the gears from the wheels upon either shaft. Also the cams 25 and 25' are so positioned upon their supporting shafts that as the cams 25 and 25' are turned the yoke 22 is the first to disconnect the members of the clutch device 6. Immediately after this happens however the cam 25' operates upon the yoke 22' and the members of the clutch device 6' are operatively disconnected. Therefore it follows that the connection between the engine shaft 1 and the shaft 4 is first interrupted and the connection between the shaft 4 and the shaft 50 is immediately thereafter interrupted. This prevents any liability of damage due to the driving and driven shafts not being disconnected from each other at proper intervals. When the parts engage each other operatively the members of the clutch device 6' first operatively engage and the members of the clutch device 6 immediately thereafter engage each other.

Having described the invention what I claim as new and desire to secure by Letters Patent is:—

A transmission gearing comprising intermediate and terminal shafts, and clutch devices coöperatively connecting said shafts, a cam shaft for operating each clutch device, a bar operatively connecting the cam shafts together for simultaneous rotative movement, the cams being so relatively arranged upon the shafts as to operate the clutch devices successively, a counter-shaft, gear wheels of different diameters located thereon, a gear wheel slidably mounted upon said intermediate shaft and adapted to be moved successively into engagement with the gear wheels upon the counter shaft, a lever mechanism for shifting the slidably mounted gear wheel, and a locking finger carried by the cam shaft connecting bar for holding the lever mechanism against movement until the cams carried by the cam shafts have operatively disconnected the members of both clutch devices.

In testimony that I claim the foregoing as my own, I have hereto affixed my signature in the presence of two witnesses.

SAMUEL W. BLEVINS.

Witnesses:
F. B. OCHSENREITER,
E. C. SCHLADT.